United States Patent
Chen et al.

(10) Patent No.: US 9,176,613 B2
(45) Date of Patent: Nov. 3, 2015

(54) TOUCH DISPLAY DRIVING CIRCUIT CAPABLE OF RESPONDING TO CPU COMMANDS

(71) Applicant: Rich IP Technology Inc., Taipei (TW)

(72) Inventors: Han-Chang Chen, Taipei (TW); Chung-Lin Chia, Taipei (TW); Chih-Wen Wu, Taipei (TW); Yen-Hung Tu, Taipei (TW); Jen-Chieh Chang, Taipei (TW)

(73) Assignee: Rich IP Technology Inc., Taipei (TW)

( * ) Notice: Subject to any disclaimer, the term of this patent is extended or adjusted under 35 U.S.C. 154(b) by 224 days.

(21) Appl. No.: 13/803,524

(22) Filed: Mar. 14, 2013

(65) Prior Publication Data
US 2014/0218310 A1    Aug. 7, 2014

(30) Foreign Application Priority Data
Feb. 1, 2013   (TW) .............................. 102103872 A

(51) Int. Cl.
  *G06F 3/041*   (2006.01)
  *G06F 3/0488*   (2013.01)
  *G06F 3/14*   (2006.01)
  *G06F 3/038*   (2013.01)
(52) U.S. Cl.
  CPC .............. *G06F 3/041* (2013.01); *G06F 3/038* (2013.01); *G06F 3/0416* (2013.01); *G06F 3/0488* (2013.01); *G06F 3/14* (2013.01)
(58) Field of Classification Search
  None
  See application file for complete search history.

(56) References Cited

U.S. PATENT DOCUMENTS

| | | | | |
|---|---|---|---|---|
| 2010/0110040 A1* | 5/2010 | Kim et al. | ...... | 345/174 |
| 2011/0080430 A1* | 4/2011 | Nishibe et al. | ...... | 345/661 |
| 2011/0175826 A1* | 7/2011 | Moore et al. | ...... | 345/173 |
| 2012/0001862 A1* | 1/2012 | Durbin et al. | ...... | 345/174 |
| 2012/0105424 A1* | 5/2012 | Lee et al. | ...... | 345/212 |
| 2012/0293447 A1* | 11/2012 | Heng et al. | ...... | 345/174 |
| 2013/0100076 A1* | 4/2013 | Tu et al. | ...... | 345/175 |
| 2013/0141344 A1* | 6/2013 | Oh | ...... | 345/173 |
| 2013/0249807 A1* | 9/2013 | You | ...... | 345/173 |
| 2013/0286302 A1* | 10/2013 | Fujioka et al. | ...... | 349/12 |
| 2014/0075381 A1* | 3/2014 | Luo | ...... | 715/810 |
| 2014/0139431 A1* | 5/2014 | Tseng et al. | ...... | 345/158 |

\* cited by examiner

*Primary Examiner* — Dismery Mercedes
(74) *Attorney, Agent, or Firm* — Ming Chow; Sinorica, LLC

(57) ABSTRACT

A touch display driving circuit capable of responding to CPU commands, including: a first interface for receiving pixel data and touch configuration data; a second interface for coupling with a touch display; and a control unit, which drives the touch display via the second interface to show an image according to the pixel data, and executes a touch detection procedure on the touch display via the second interface, wherein the touch detection procedure is determined according to the touch configuration data.

20 Claims, 21 Drawing Sheets

TOUCH DISPLAY DRIVING CIRCUIT CAPABLE OF RESPONDING TO CPU COMMANDS

The current application claims a foreign priority to the patent application of Taiwan No. 102103872 filed on Feb. 1, 2013.

BACKGROUND OF THE INVENTION

1. Field of the Invention

The present invention relates to a driving circuit for a touch display, especially to a touch display driving circuit capable of responding to CPU (central processing unit) commands.

2. Description of the Related Art

Please refer to FIG. 1, which illustrates a block diagram of a prior art driving structure for a touch display. As illustrated in FIG. 1, a driving circuit 100, in which a micro processor or a micro controller is included, receives pixel data $D_{IMG}$ from a CPU 110 via an image data interface 101, and generates a set of pixel driving signals $S_{DISP}$ according to the pixel data $D_{IMG}$ to drive a touch display module 120, and thereby display an image. Besides, the driving circuit 100 drives the touch display module 120 via a set of touch signals $S_{TP}$ to derive touch data $D_{TOUCH}$, and transmits the touch data $D_{TOUCH}$ to the CPU 110 via a touch data interface 102.

In touch applications of simple functions or small sizes, the micro processor or micro controller in the driving circuit 100 of prior art needs not to be very powerful to handle a task involved in the touch applications. However, as the demands for touch function become complex, the micro processor or micro controller in the driving circuit 100 may no longer afford the loading of a complex task demand. One solution is to use a powerful micro processor or micro controller in the driving circuit 100. However, this will increase the cost of the driving circuit 100 and affect the competitiveness of a touch product resulted thereby.

To solve the foregoing problem, a novel touch display driving circuit architecture is needed.

SUMMARY OF THE INVENTION

One objective of the present invention is to disclose a driving circuit capable of configuring and executing a touch detection procedure according to a CPU's commands.

Another objective of the present invention is to disclose a driving circuit capable of receiving touch configuration data from a CPU, wherein the touch configuration data includes multiple control bits for determining a connection configuration of at least one multiplexer, and a weighting configuration of at least one touch point.

Another objective of the present invention is to disclose a driving circuit capable of receiving touch configuration data from a CPU, wherein the touch configuration data includes at least one control bit for enabling/disabling at least one touch point.

Another objective of the present invention is to disclose a driving circuit capable of receiving touch configuration data from a CPU, and using the touch configuration data to execute a resistor-capacitor delay compensation function.

Another objective of the present invention is to disclose a driving circuit capable of receiving touch configuration data from a CPU, and using the touch configuration data to execute a dynamic driving function.

Another objective of the present invention is to disclose a driving circuit capable of receiving touch configuration data from a CPU, and using the touch configuration data to execute an adaptive driving function.

Another objective of the present invention is to disclose a driving circuit capable of receiving touch configuration data from a CPU, and using the touch configuration data to execute a multi-stage driving function.

Another objective of the present invention is to disclose a driving circuit capable of receiving touch configuration data from a CPU, and using the touch configuration data to execute a three-dimensional touch detection function.

Another objective of the present invention is to disclose a driving circuit capable of receiving touch configuration data from a CPU, and using the touch configuration data to execute a GUI (graphical user interface) touch detection function.

To attain the foregoing objectives, a touch display driving circuit capable of responding to CPU commands is proposed, the touch display driving circuit including:

a first interface for receiving pixel data and touch configuration data from a CPU;

a second interface for coupling with a touch display module; and a control unit, which drives the touch display module via the second interface to show an image according to the pixel data, and executes a touch detection procedure on the touch display module via the second interface, wherein the touch detection procedure is determined according to the touch configuration data.

In one embodiment, the touch display driving circuit capable of responding to CPU commands further includes a third interface for transmitting touch data to the CPU, wherein the touch data is derived by the control unit during an execution of the touch detection procedure.

In one embodiment, the control unit includes a timing control unit, a source driver unit, a gate driver unit, a touch driver unit, and a touch detection unit.

In one embodiment, the control unit further includes a memory unit for storing the touch data.

In one embodiment, the touch display driving circuit capable of responding to CPU commands is implemented by a single integrated circuit.

In one embodiment, the touch display driving circuit capable of responding to CPU commands is implemented by multiple integrated circuits.

In one embodiment, the touch display module has a flat panel display and a touch array.

In one embodiment, the flat panel display is one selected from a group consisting of a thin-film-transistor display, an organic-light-emitting-diode display, a nanometer-carbon-tube display, a super-twisted-nematic display, and a field-emission display.

In one embodiment, the touch array is one selected from a group consisting of a capacitive type touch array, a resistive type touch array, an optical type touch array, an acoustic type touch array, a pressure sensing type touch array, and a radar type touch array.

In one embodiment, the first interface transmits data in a serial manner or a parallel manner.

In one embodiment, the touch configuration data includes multiple control bits.

In one embodiment, the multiple control bits included in the touch configuration data are used to determine a connection configuration of at least one multiplexer, and a weighting configuration of at least one touch point.

In one embodiment, the multiple control bits included in the touch configuration data are further used to enable/disable at least one touch point.

In one embodiment, the control unit uses the touch configuration data to execute the touch detection procedure to provide a resistor-capacitor delay compensation function.

In one embodiment, the control unit uses the touch configuration data to execute the touch detection procedure to provide a dynamic driving function.

In one embodiment, the control unit uses the touch configuration data to execute the touch detection procedure to provide an adaptive driving function.

In one embodiment, the control unit uses the touch configuration data to execute the touch detection procedure to provide a multi-stage driving function.

In one embodiment, the control unit uses the touch configuration data to execute the touch detection procedure to provide a three-dimensional touch detection function.

In one embodiment, the control unit uses the touch configuration data to execute the touch detection procedure to provide a GUI (graphical user interface) touch detection function.

To attain the foregoing objectives, another touch display driving circuit capable of responding to CPU commands is proposed, the touch display driving circuit including:

a first interface for receiving touch configuration data from a CPU;

a second interface for coupling with a touch module; and a control unit, which drives the touch module via the second interface to execute a touch detection procedure, wherein the touch detection procedure is determined according to the touch configuration data.

In one embodiment, the touch display driving circuit capable of responding to CPU commands further includes a third interface for transmitting touch data to the CPU, wherein the touch data is derived by the control unit during an execution of the touch detection procedure.

In one embodiment, the touch module has a touch array, which is one selected from a group consisting of a capacitive type touch array, a resistive type touch array, an optical type touch array, an acoustic type touch array, a pressure sensing type touch array, and a radar type touch array.

In one embodiment, the touch display driving circuit capable of responding to CPU commands is implemented by a single integrated circuit.

In one embodiment, the touch display driving circuit capable of responding to CPU commands is implemented by multiple integrated circuits.

In one embodiment, the first interface transmits data in a serial manner or a parallel manner.

In one embodiment, the touch configuration data includes multiple control bits.

In one embodiment, the multiple control bits included in the touch configuration data are used to determine a connection configuration of at least one multiplexer, and a weighting configuration of at least one touch point.

In one embodiment, the multiple control bits included in the touch configuration data are further used to enable/disable at least one touch point.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
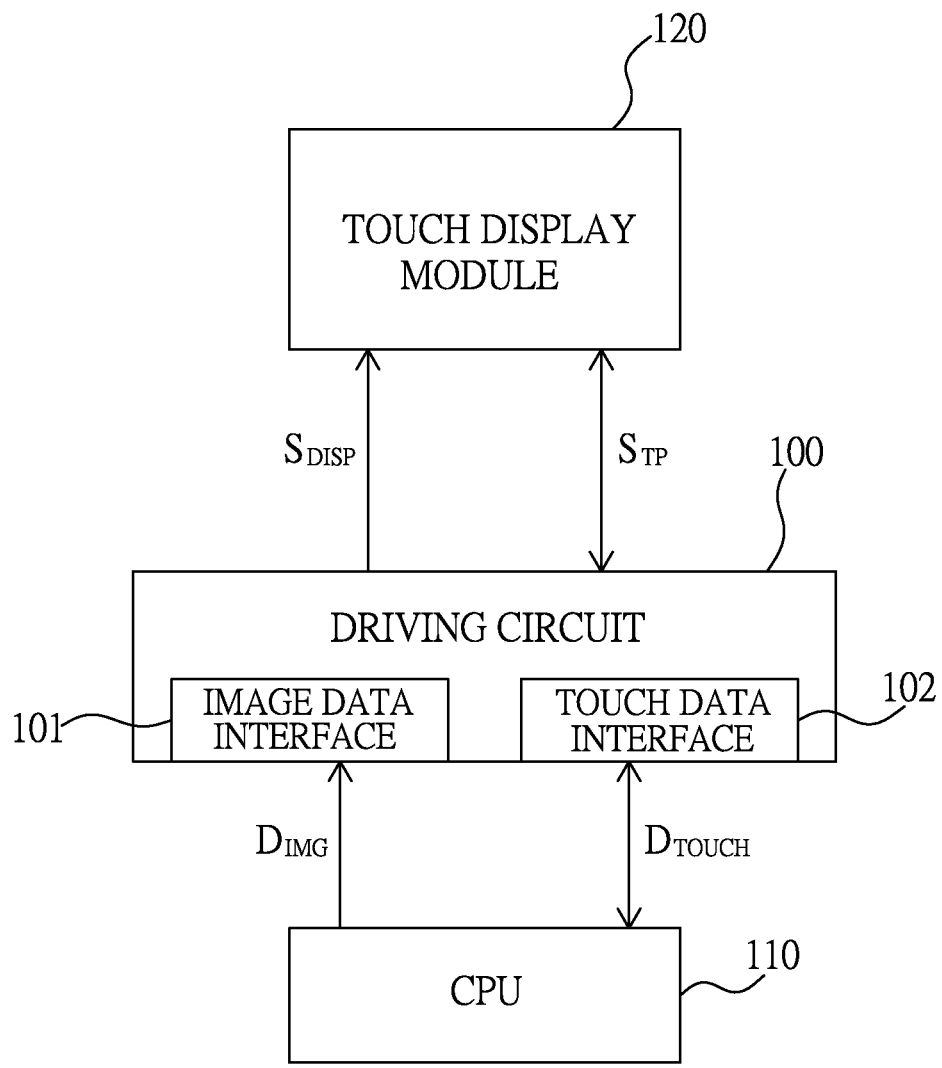
FIG. 1 illustrates a block diagram of a prior art driving architecture of a touch display.
Figure 2:
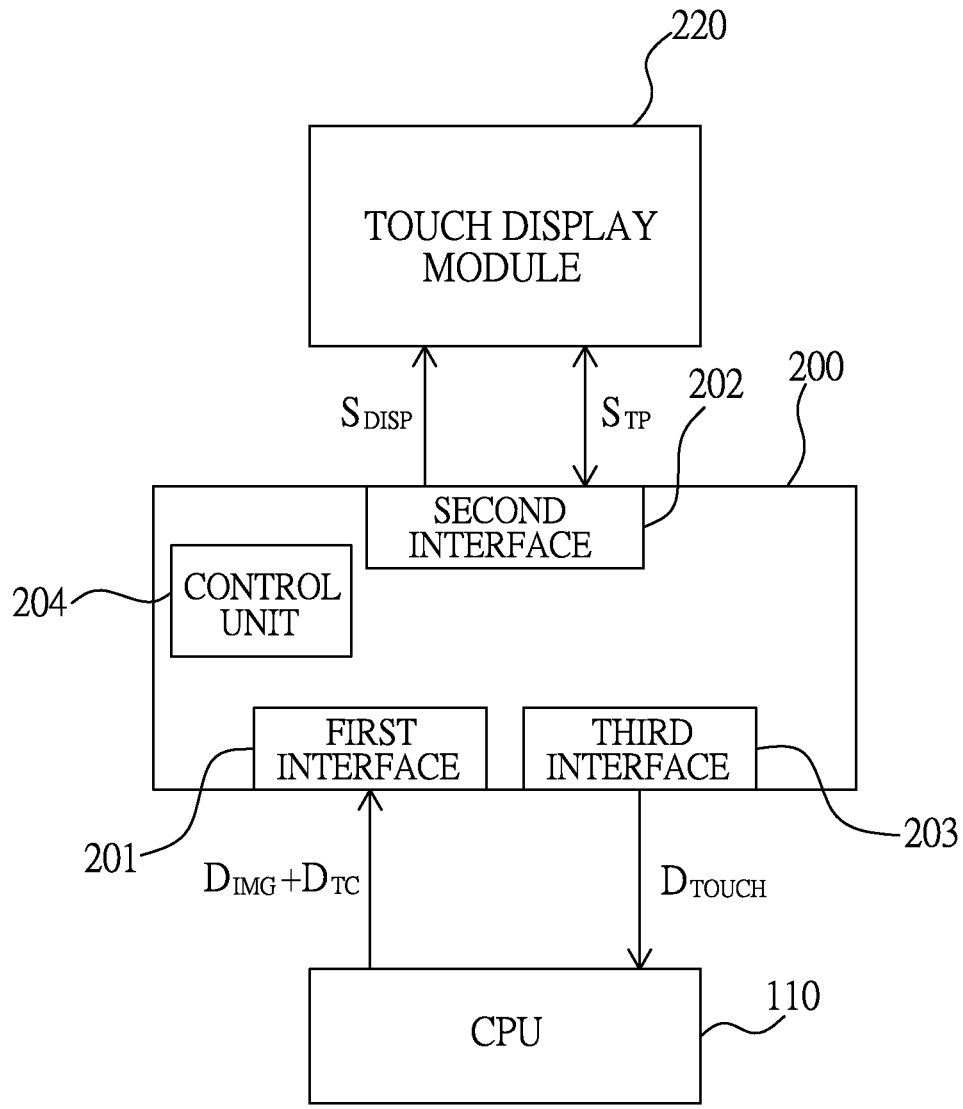
FIG. 2 illustrates a block diagram of a system having a touch/display function, the system including a preferred embodiment of a driving circuit of the present invention.

Please refer to FIG. 2, which illustrates a block diagram of a system having touch/display function, the system including a driving circuit according to a preferred embodiment of the present invention. As illustrated in FIG. 2, a driving circuit 200 is coupled with a CPU 210 and a touch display module 220 respectively, wherein the driving circuit 200 and the touch display module 220 form a touch display, and the CPU 210 can be located in a personal computer, a tablet computer, or any portable information processing device.

The driving circuit 200 has a first interface 201, a second interface 202, a third interface 203, and a control unit 204.

The first interface 201 is used to receive pixel data $D_{IMG}$ and touch configuration data $D_{TC}$ from the CPU 210, wherein the first interface 201 can transmit data in a serial manner or a parallel manner.

The second interface 202 is used to couple with the touch display module 220.

The third interface 203 is used to transmit touch data $D_{TOUCH}$ to CPU 210, wherein the touch data $D_{TOUCH}$ is derived by the control unit 204 during an execution of a touch detection procedure, and the third interface 203 can be an interface of I2C (inter integrated circuit), SPI (serial peripheral interface), 3W (3-wire), USB (universal serial bus), TTL (transistor-transistor logic), or LVDS (low voltage differential signal).

The control unit 204 uses the second interface 202 to drive the touch display module 220 to show an image according to the pixel data $D_{IMG}$, and executes the touch detection procedure on the touch display module 220 via the second interface 202, wherein the touch detection procedure is determined according to the touch configuration data $D_{TC}$.

Figure 3:
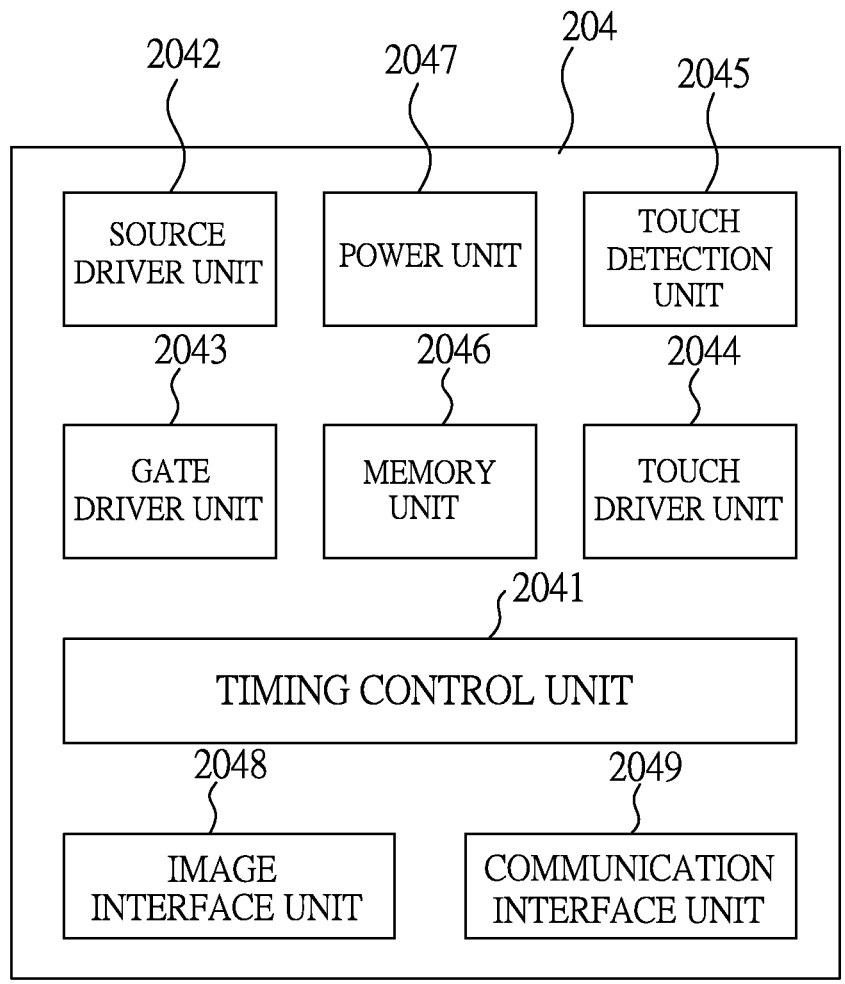
FIG. 3 illustrates a block diagram of a preferred embodiment of a control unit of FIG. 2.

FIG. 3 illustrates a block diagram of a preferred embodiment of the control unit 204. As illustrated in FIG. 3, the control unit 204 has a timing control unit 2041, a source driver unit 2042, a gate driver unit 2043, a touch driver unit 2044, a touch detection unit 2045, a memory unit 2046, a power unit 2047, an image interface unit 2048, and a communication interface unit 2049.

The timing control unit 2041 is used to control an operation timing of the source driver unit 2042, the gate driver unit 2043, the touch driver unit 2044, and the touch detection unit 2045 according to the touch configuration data $D_{TC}$, so as to execute an image display procedure and/or the touch detection procedure.

The memory unit 2046 is used to store the touch data $D_{TOUCH}$.

The power unit 2047 can provide driving voltages for the source driver unit 2042 and the touch driver unit 2044.

The image interface unit 2048 is used to couple with the first interface 201 to receive the pixel data $D_{IMG}$ and the touch configuration data $D_{TC}$ from the CPU 210, and couple with the third interface 203 to transmit the touch data $D_{TOUCH}$ to the CPU 210. The touch data $D_{TOUCH}$ can include touch coordinates, a touch image, and vector information derived from multiple frames of the touch images, wherein the vector information can be used to predict a next touch location.

The communication interface 2049 is used to control data transmission of the first interface 201 and data transmission of the third interface 203.

Figure 4:
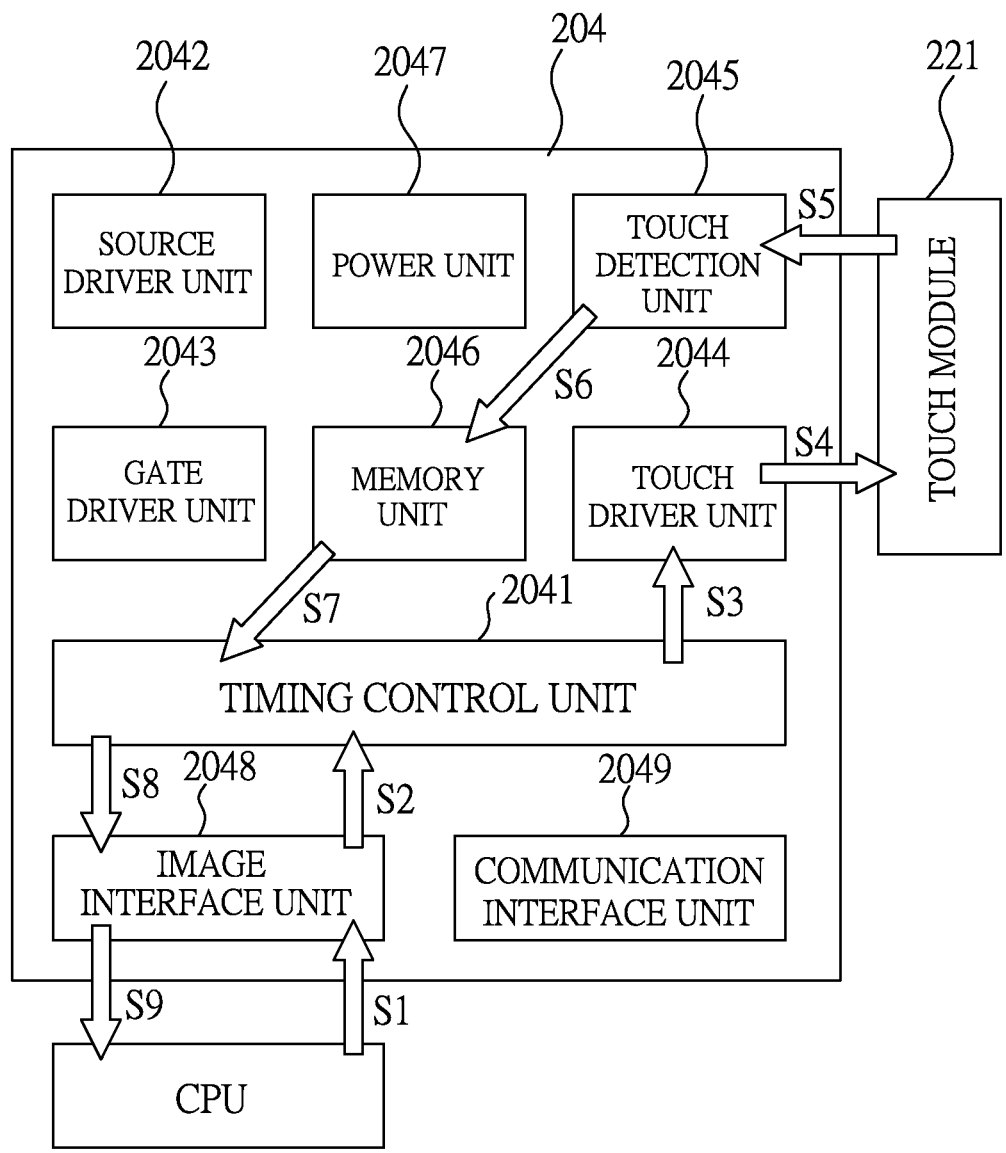
FIG. 4 is an illustrative example of how the control unit of FIG. 3 executes a touch detection procedure.

Please refer to FIG. 4, which is an illustrative example of how the control unit 204 of FIG. 3 executes the touch detection procedure. As illustrated in FIG. 4, in the first step, the CPU 210 transmits the touch configuration data $D_{TC}$ to the image interface unit 2048. In the second step, the image interface unit 2048 transmits the touch configuration data $D_{TC}$ to the timing control unit 2041. In the third step, the timing control unit 2041 makes the touch driver unit 2044 operate in a touch driving mode according to the touch configuration data $D_{TC}$, which includes multiple control bits for determining a connection configuration of at least one multiplexer and a weighting configuration of at least one touch point, and enabling/disabling the at least one touch point. In the fourth step, the touch driver unit 2044 drives a touch module 221 of the touch display module 220, wherein the touch module 221 has a touch array, which is one selected from a group consisting of a capacitive type touch array, a resistive type touch array, an optical type touch array, an acoustic type touch array, a pressure sensing type touch array, and a radar type touch array. In the fifth step, the touch module 221 transmits touch sensing signals to the touch detection unit 2045. In the sixth step, the touch detection unit 2045 transmits touch data, which is derived from the touch sensing signals, to the memory unit 2046. In the seventh step, the timing control unit 2041 reads the touch data from the memory unit 2046. In the eighth step, the timing control unit 2041 transmits the touch data to the image interface unit 2048. In the ninth step, the image interface unit 2048 transmits the touch data to the CPU 210.

In one embodiment, the touch configuration data $D_{TC}$ has 8 control bits $D_0$-$D_7$, wherein, $D_0$ is used to enable/disable at least one touch point; $D_1$-$D_2$ are used to control a connection configuration of at least one multiplexer—the connection configuration of the at least one multiplexer can combine multiple touch points into an effective touch point—to determine at least one touch detection area; $D_3$-$D_4$ are used to control a weighting configuration of at least one touch point to provide a touch discrimination effect, wherein the weighting configuration can alter a signal gain and/or a threshold voltage of the touch detection unit 2045 to generate the touch discrimination effect, and thereby meet a touch request of an application program executed by the CPU 210; and $D_5$-$D_7$ are used to control a charging voltage for at least one touch point. FIG. 6-11 illustrates multiple functions generated by taking advantage of the touch configuration data $D_{TC}$.

Figure 5A:
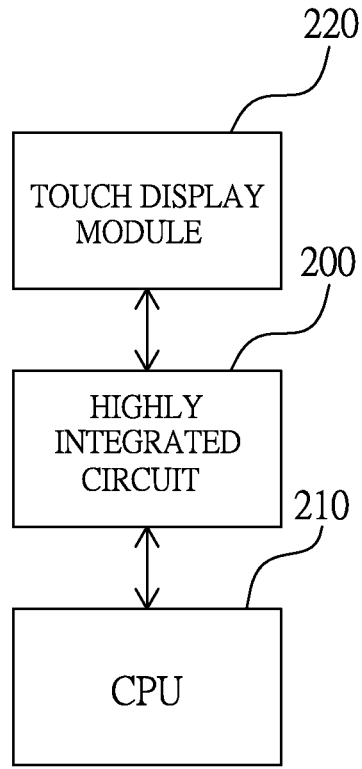
FIG. 5(a) illustrates an embodiment of the driving circuit of FIG. 2 implemented by a highly integrated circuit.
Figure 5B:
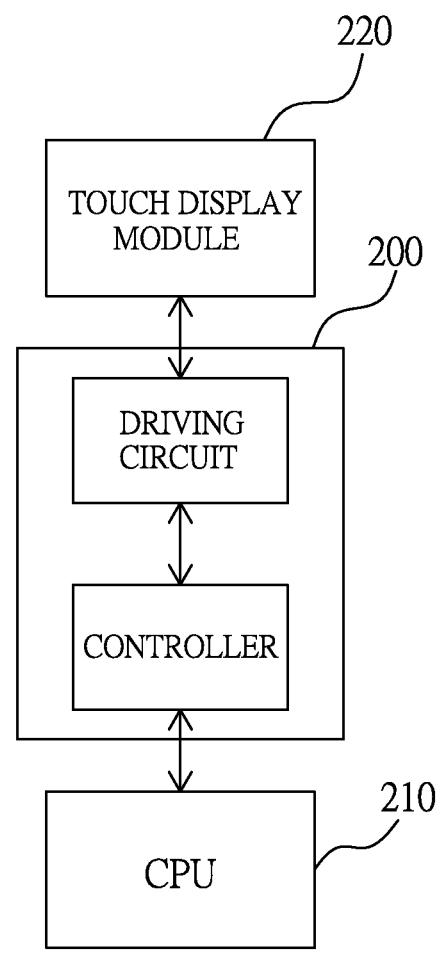
FIG. 5(b) illustrates an embodiment of the driving circuit of FIG. 2 implemented by a driving circuit and a controller.
Figure 5C:
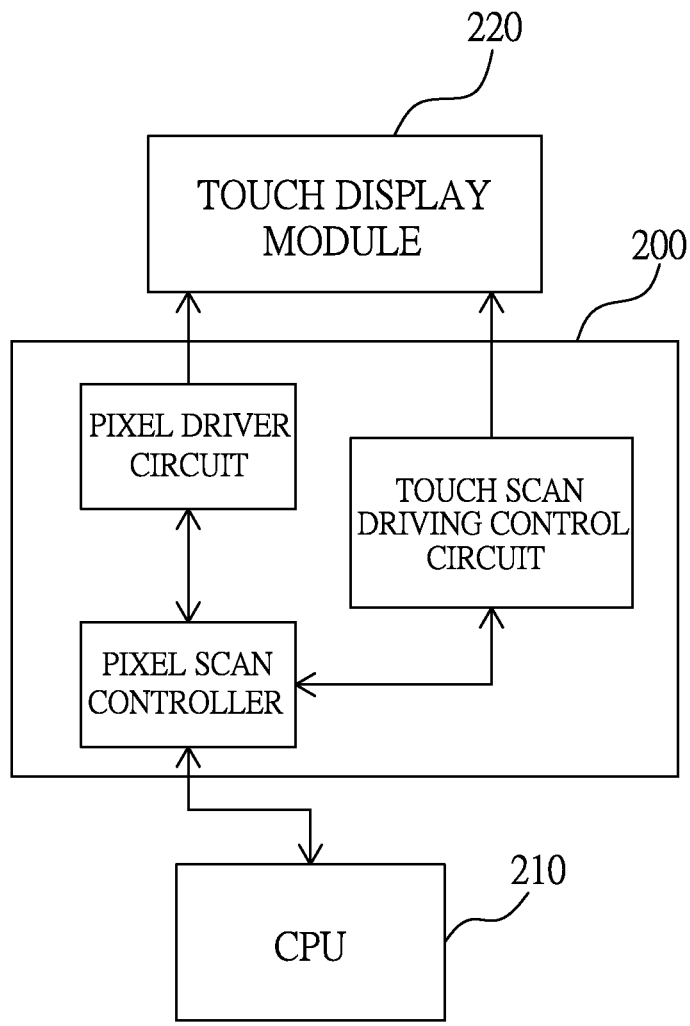
FIG. 5(c) illustrates an embodiment of the driving circuit of FIG. 2 implemented by a pixel driver circuit, a pixel scan controller, and a touch scan driving control circuit.
Figure 5D:
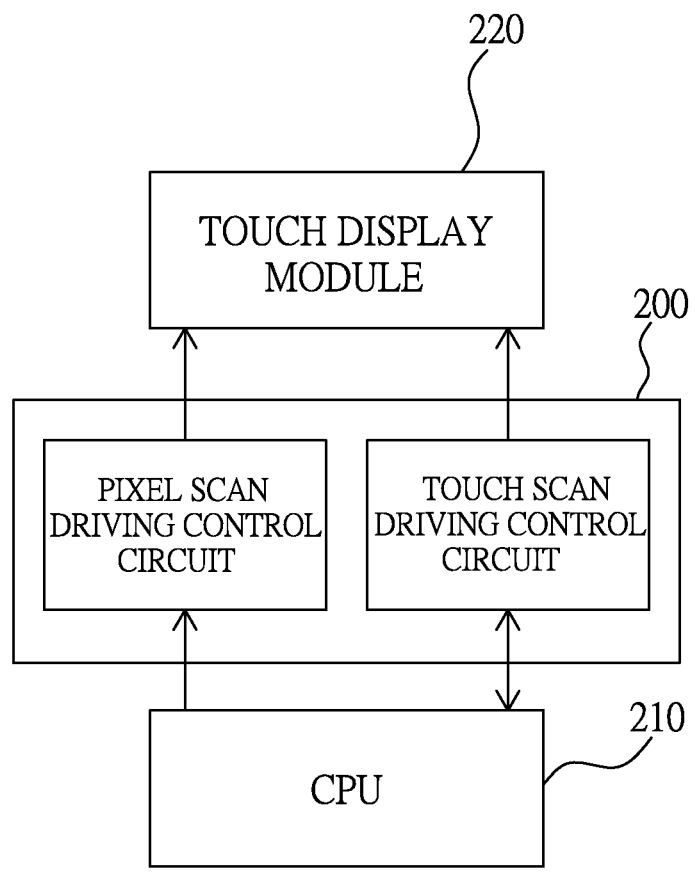
FIG. 5(d) illustrates an embodiment of the driving circuit of FIG. 2 implemented by a pixel scan driving control circuit and a touch scan driving control circuit.

The driving circuit 200 can be implemented by a single integrated circuit or multiple integrated circuits. Please refer to FIG. 5(a)-5(d), wherein FIG. 5(a) illustrates an embodiment of the driving circuit 200 implemented by a highly integrated circuit; FIG. 5(b) illustrates an embodiment of the driving circuit 200 implemented by a driving circuit and a controller; FIG. 5(c) illustrates an embodiment of the driving circuit 200 implemented by a pixel driver circuit, a pixel scan controller, and a touch scan driving control circuit; and FIG. 5(d) illustrates an embodiment of the driving circuit 200 implemented by a pixel scan driving control circuit and a touch scan driving control circuit.

Besides, the touch display module 220 has a flat panel display, which is one selected from a group consisting of a thin-film-transistor display, an organic-light-emitting-diode display, a nanometer-carbon-tube display, a super-twisted-nematic display, and a field-emission display.

Figure 6:
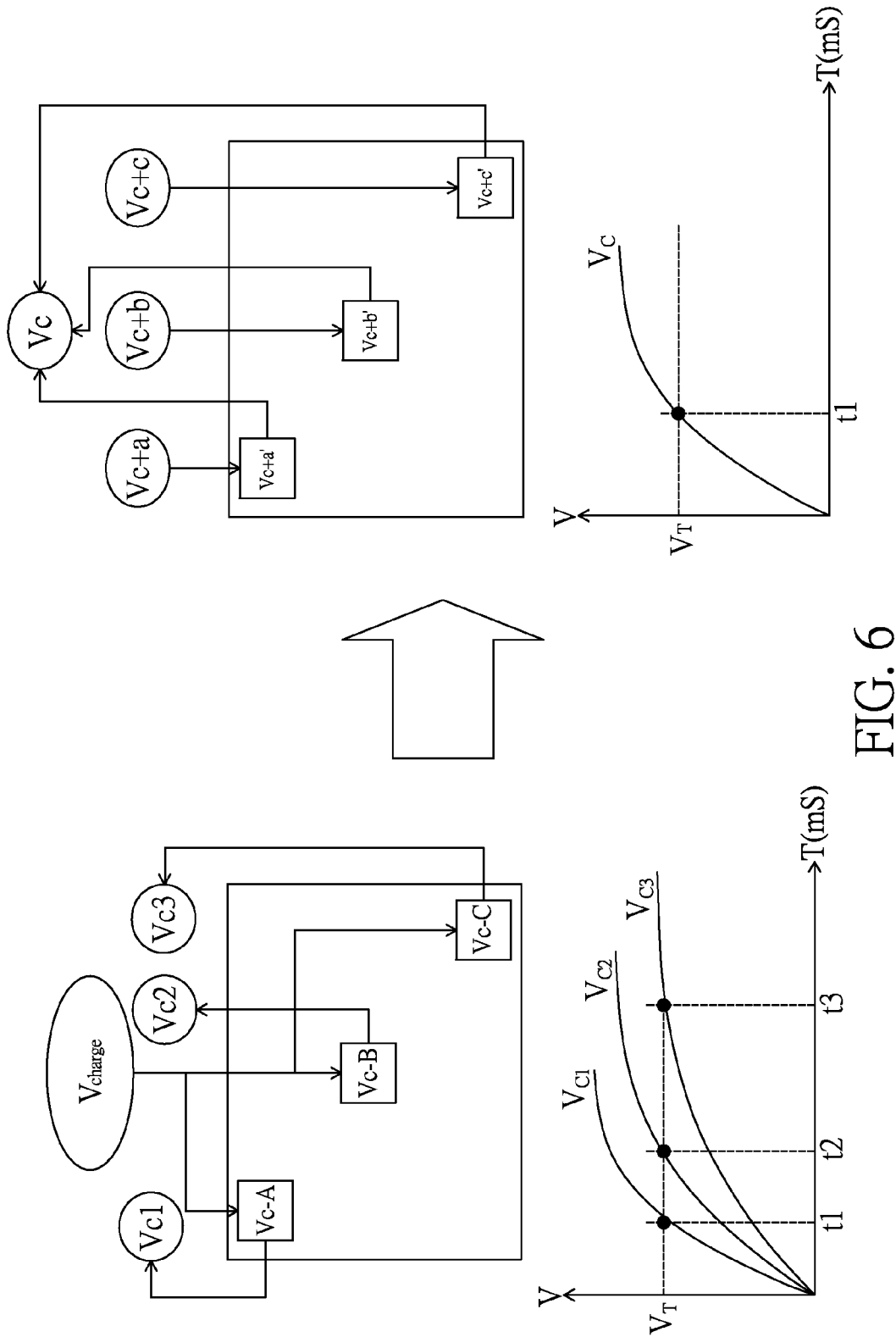
FIG. 6 illustrates a scenario where the control unit of FIG. 2 utilizes touch configuration data to configure a touch detection procedure to provide a resistor-capacitor delay compensation function.

Thanks to the foregoing arrangement, the present invention can provide multiple functions. Please refer to FIG. 6, which illustrates a scenario where the control unit 204 utilizes the touch configuration data $D_{TC}$ to configure the touch detection procedure to provide a resistor-capacitor delay compensation function. As illustrated in FIG. 6, if points A, B, C in a touch array are charged with a same voltage $V_{charge}$, three responding voltages $V_{C1}$、$V_{C2}$、$V_{C3}$ will reach a threshold voltage $V_T$ at different time points t1, t2, and t3. However, by utilizing the touch configuration data $D_{TC}$, the present invention can use three different voltages $V_{c+a}$、$V_{c+b}$、$V_{c+c}$ to charge points A, B, C respectively, so that the three responding voltages reach the threshold voltage $V_T$ at a same time point. By this arrangement, the resistor-capacitor delay compensation function is provided by the touch detection procedure of the present invention.

Figure 7:
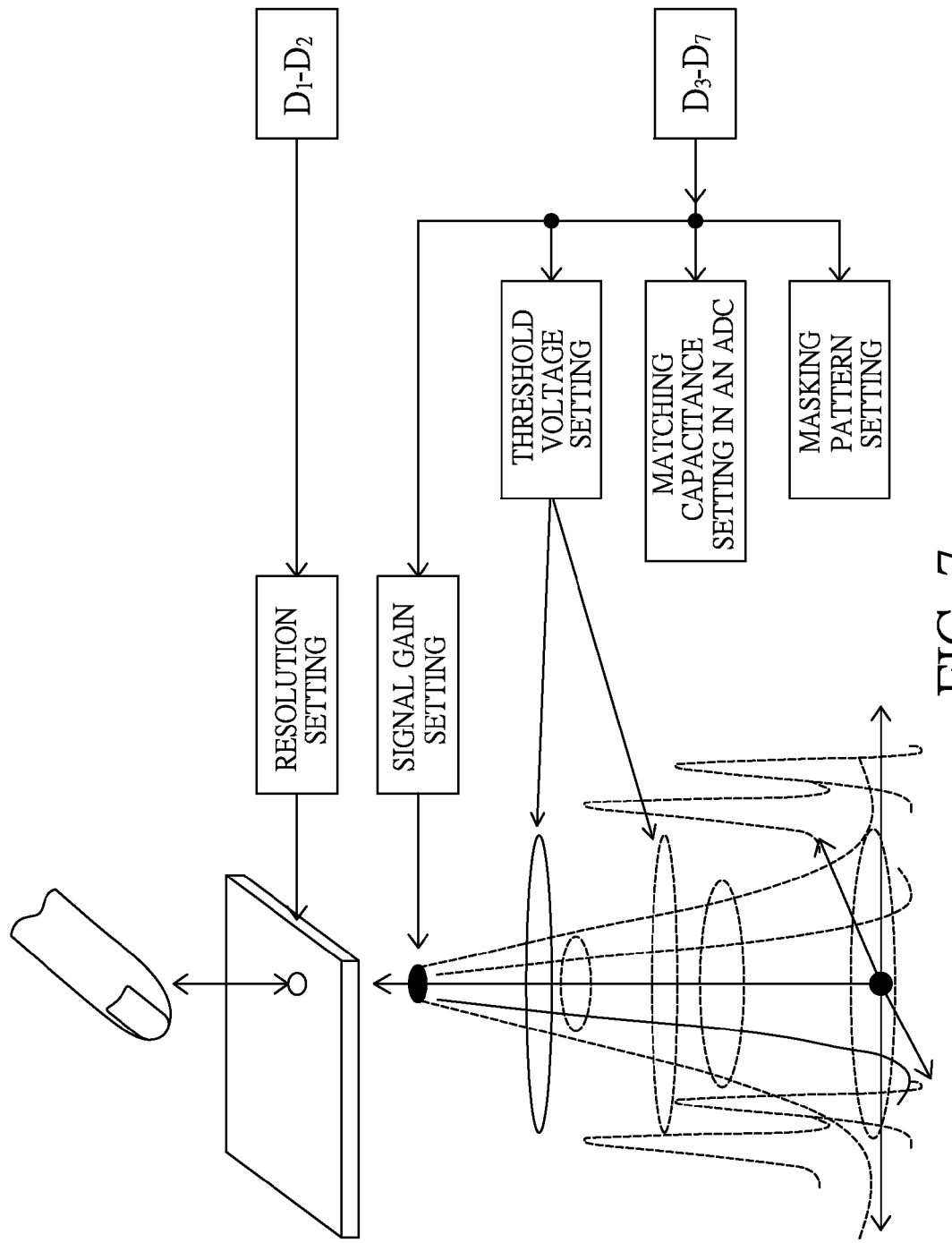
FIG. 7 illustrates a scenario where the control unit of FIG. 2 utilizes touch configuration data to configure a touch detection procedure to provide a dynamic driving function.

Please refer to FIG. 7, which illustrates a scenario where the control unit 204 utilizes the touch configuration data $D_{TC}$ to configure the touch detection procedure to provide a dynamic driving function. As illustrated in FIG. 7, $D_1$-$D_2$ are used to set a resolution of a touch array, and $D_3$-$D_7$ are used to set a signal gain, a threshold voltage, a matching capacitance in an ADC (analog to digital conversion) circuit, and a masking pattern. By this arrangement, the dynamic driving function is provided by the touch detection procedure of the present invention.

Figure 8:
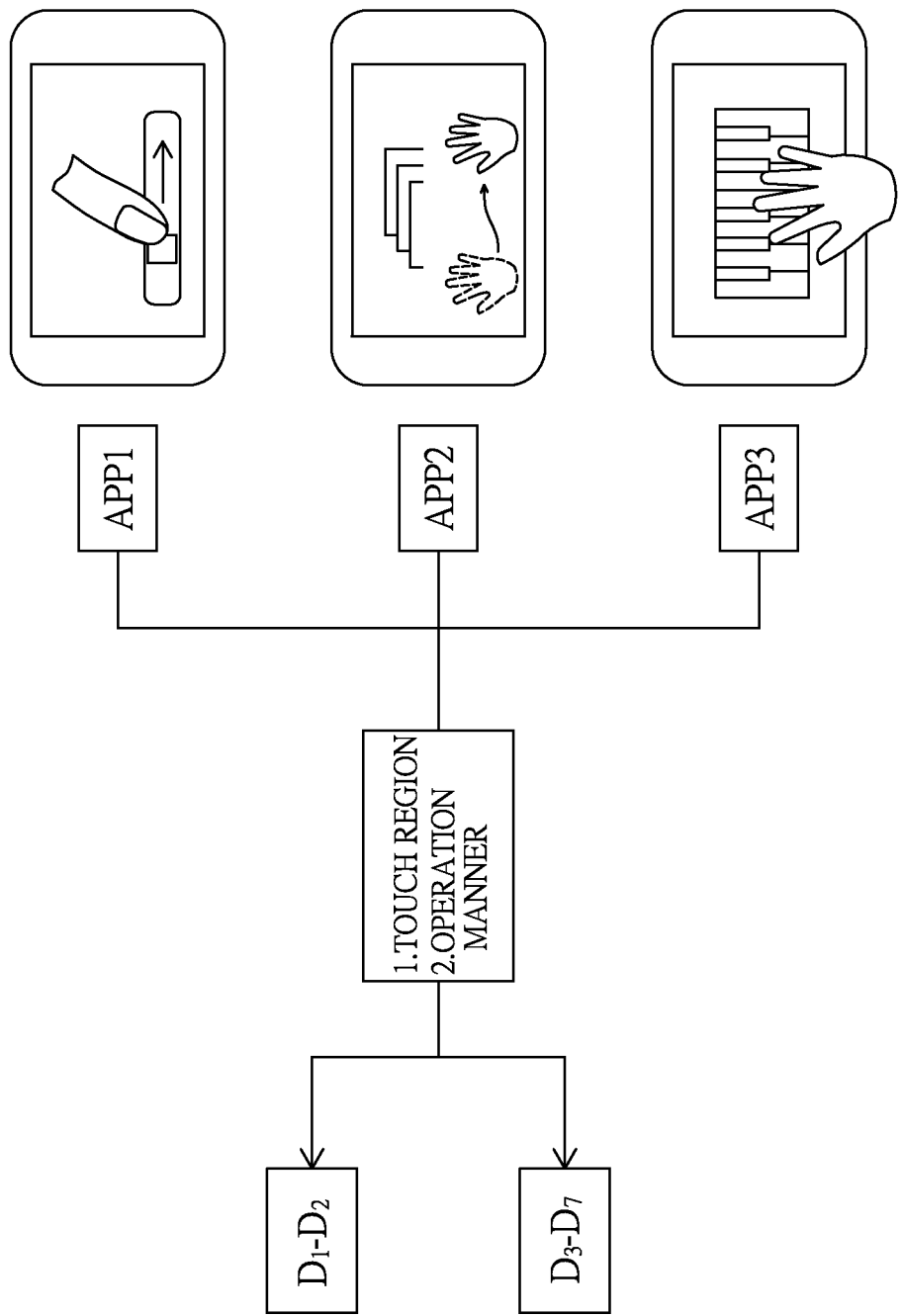
FIG. 8 illustrates a scenario where the control unit of FIG. 2 utilizes touch configuration data to configure a touch detection procedure to provide an adaptive driving function.

Please refer to FIG. 8, which illustrates a scenario where the control unit 204 utilizes the touch configuration data $D_{TC}$ to configure the touch detection procedure to provide an adaptive driving function. As illustrated in FIG. 8, $D_1$-$D_2$ and $D_3$-$D_7$ are generated according to a touch region (by a finger or a palm) and an operation manner (dragging or pressing) demanded by an application program (APP1, APP2, or APP3), to configure the touch detection procedure to provide the adaptive driving function.

Figure 9:
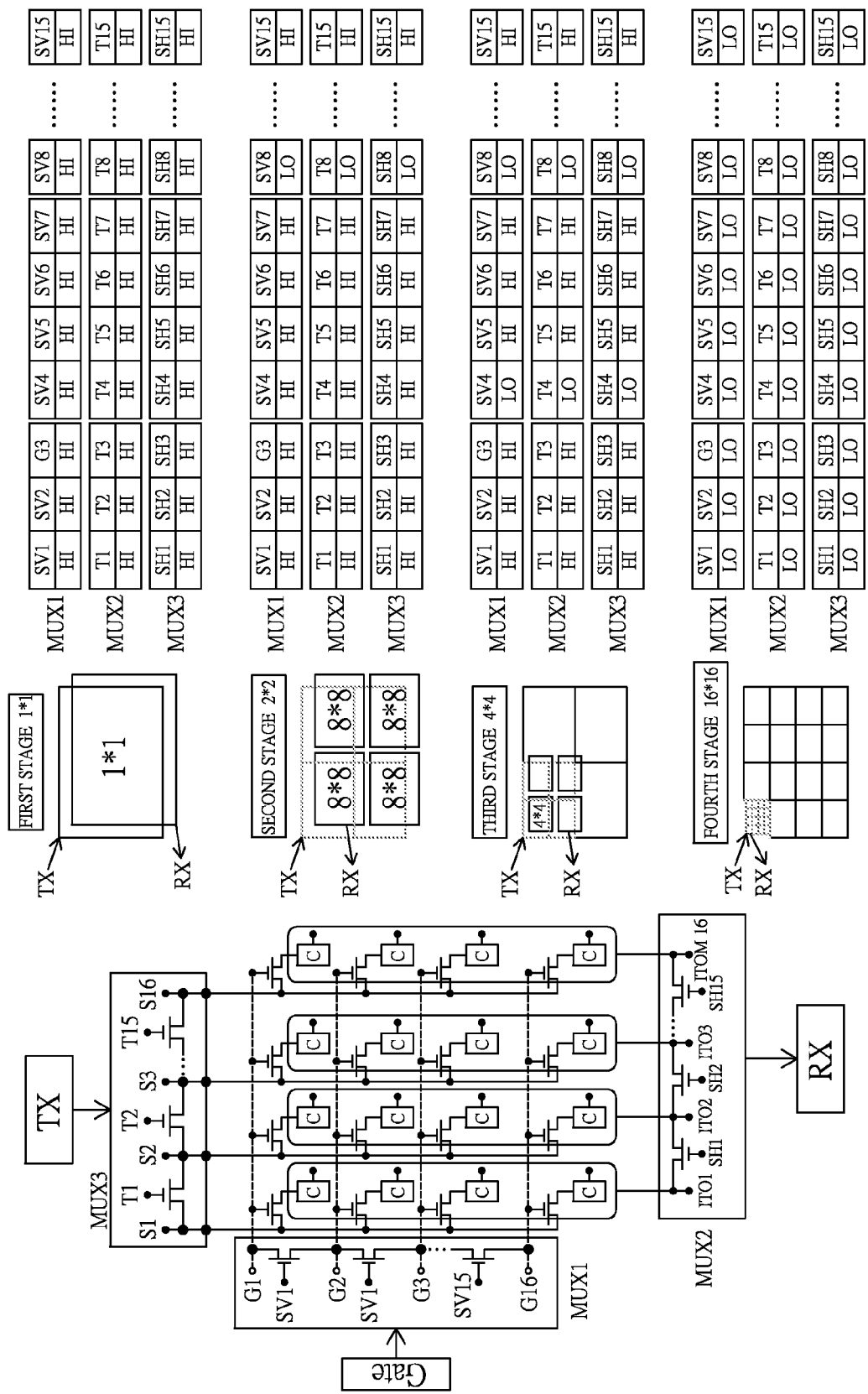
FIG. 9 illustrates a scenario where the control unit of FIG. 2 utilizes touch configuration data to configure a touch detection procedure to provide a multi-stage driving function.

Please refer to FIG. 9, which illustrates a scenario where the control unit 204 utilizes the touch configuration data $D_{TC}$ to configure the touch detection procedure to provide a multi-stage driving function. As illustrated in FIG. 9, by using the touch configuration data $D_{TC}$ to control multiplexers MUX1-MUX3, a touch array is configured to have a resolution of 1*1 at first stage, a resolution of 2*2 at second stage, a resolution of 4*4 at third stage, and a resolution of 16*16 at fourth stage. By this arrangement, the multi-stage driving function is provided by the touch detection procedure of the present invention.

Figure 10:
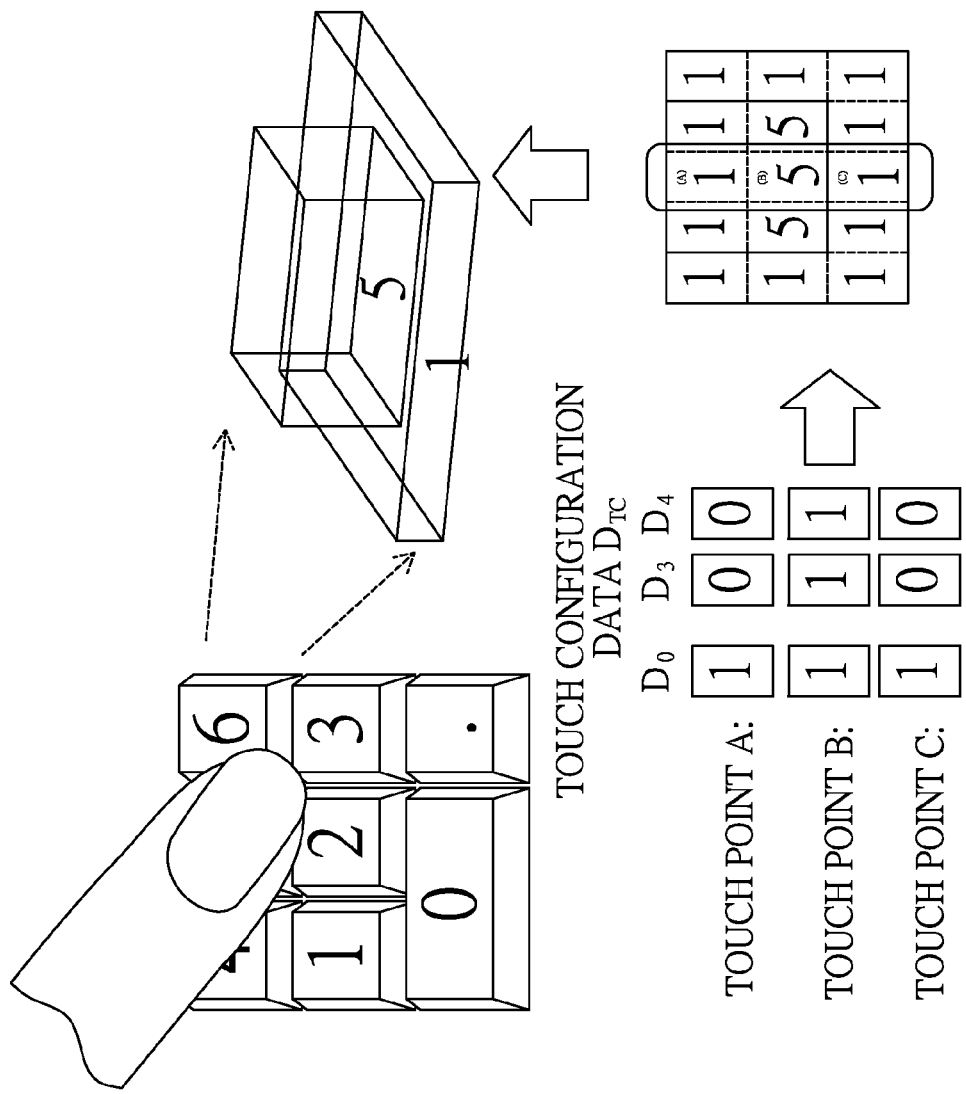
FIG. 10 illustrates a scenario where the control unit of FIG. 2 utilizes touch configuration data to configure a touch detection procedure to provide a three-dimensional touch detection function.

Please refer to FIG. 10, which illustrates a scenario where the control unit 204 utilizes the touch configuration data $D_{TC}$ to configure the touch detection procedure to provide a three-dimensional touch detection function. As illustrated in FIG. 10, $D_0$ is used to enable/disable touch points (A, B, C for example) of a 3D GUI button; $D_3$-$D_4$ are used to determine corresponding weighting values of the touch points (A, B, C for example) of the 3D GUI button. By this arrangement, the three-dimensional touch detection function is provided by the touch detection procedure of the present invention.

Figure 11:
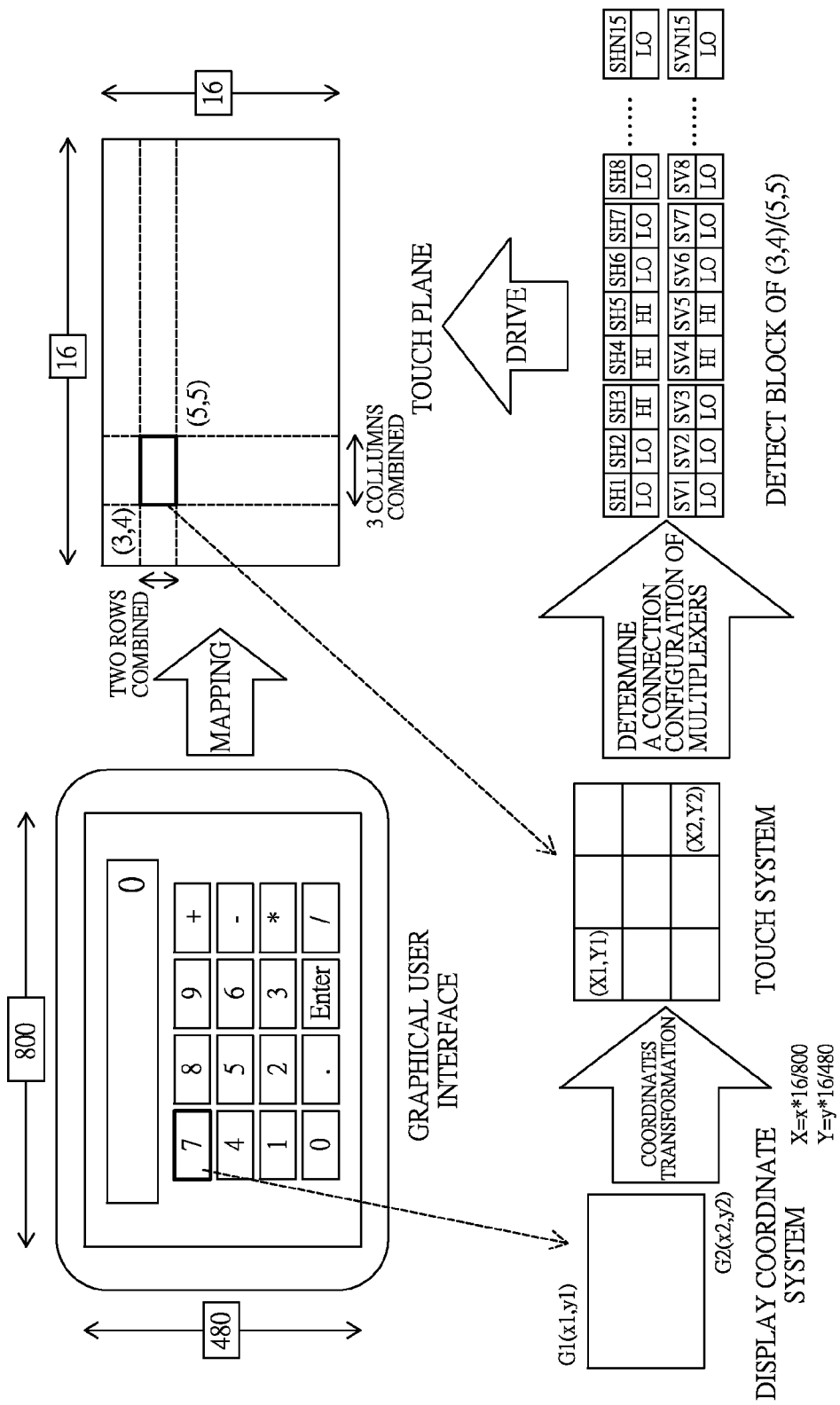
FIG. 11 illustrates a scenario where the control unit of FIG. 2 utilizes touch configuration data to configure a touch detection procedure to provide a graphical user interface touch detection function.

Please refer to FIG. 11, which illustrates a scenario where the control unit 204 utilizes the touch configuration data $D_{TC}$ to configure the touch detection procedure to provide a graphical user interface touch detection function. As illustrated in FIG. 11, a graphical user interface of a resolution of 800*480 is mapped to a touch plane of 16*16. Each button of the graphical user interface has a corresponding area in the touch plane. Take button 7 for example: to detect a touch on the button 7, the touch configuration data $D_{TC}$ can be used to determine a connection configuration of a multiplexer to scan a corresponding area in the touch plane of the button 7. By this arrangement, the graphical user interface touch detection function is provided by the touch detection procedure of the present invention.

FIG. 12(a)-12(d) illustrates four scan control flowcharts with the control unit 204 receiving the pixel data $D_{IMG}$ and the touch configuration data $D_{TC}$ in a parallel way.

Figure 12A:
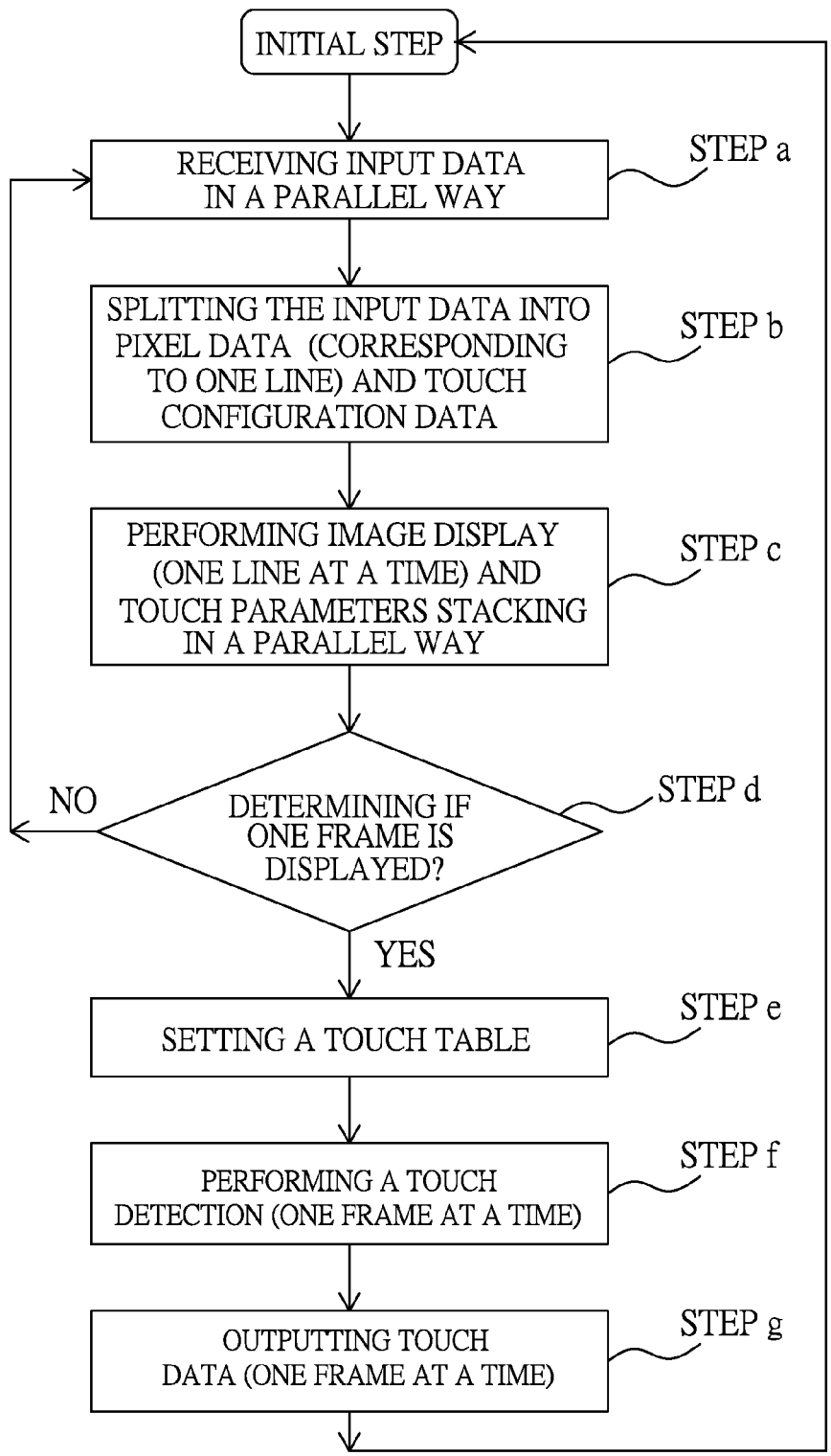
FIG. 12(a)-12(d) illustrates four scan control flowcharts with the control unit of FIG. 2 receiving pixel data and touch configuration data in a parallel way.

FIG. 12(a) illustrates a scan control flowchart, including: receiving input data in a parallel way (step a); splitting the input data into pixel data (corresponding to one line) and touch configuration data (step b); performing image display (one line at a time) and touch parameters stacking in a parallel way (step c); determining if one frame is displayed? If yes, then go to step e; if no, go to step a (step d); setting a touch table (step e); performing a touch detection (one frame at a time) (step f); and outputting touch data (one frame at a time) (step g).

Figure 12B:
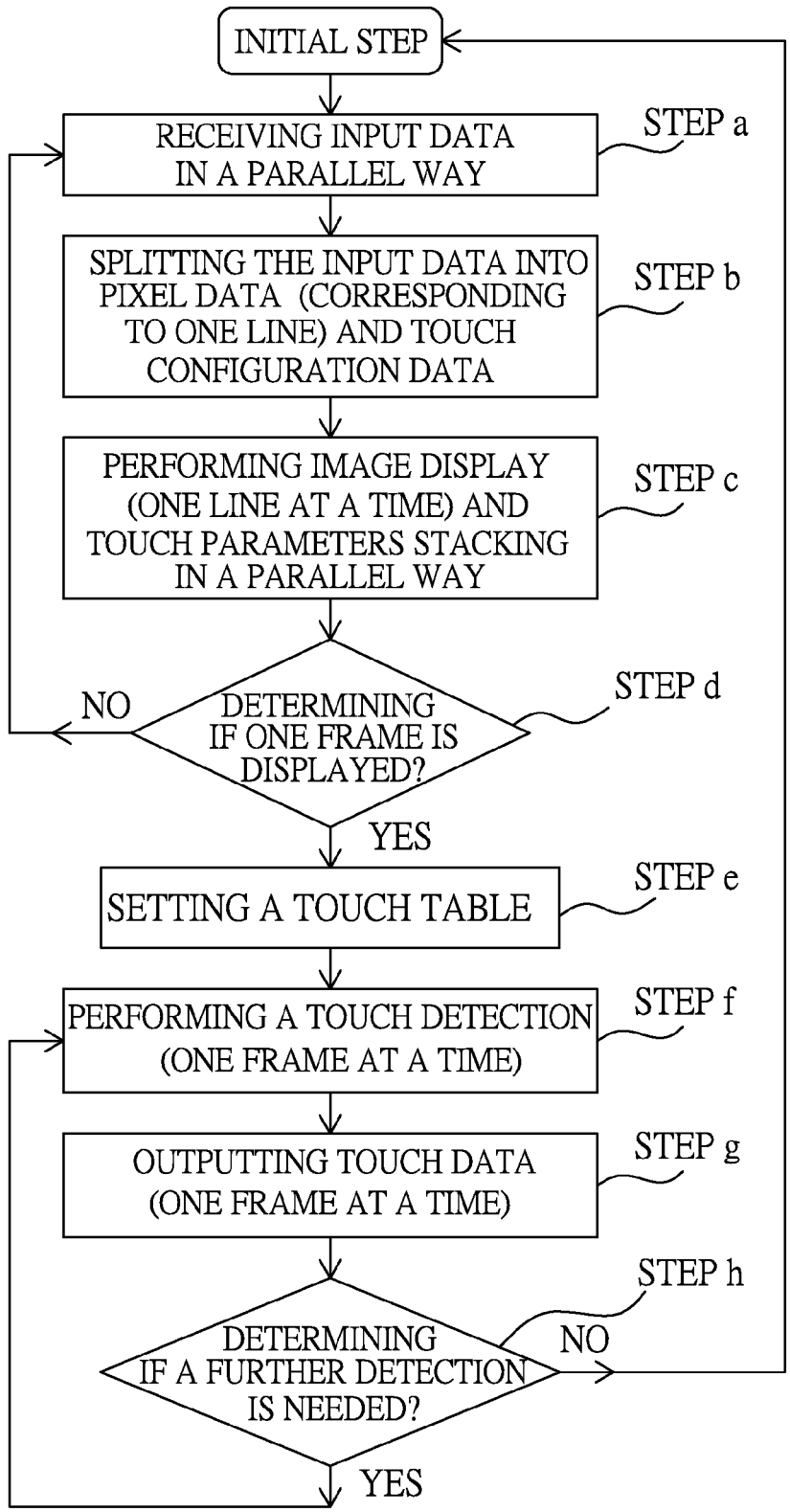

FIG. 12(b) illustrates another scan control flowchart, including: receiving input data in a parallel way (step a); splitting the input data into pixel data (corresponding to one line) and touch configuration data (step b); performing image display (one line at a time) and touch parameters stacking in a parallel way (step c); determining if one frame is displayed? If yes, then go to step e; if no, go to step a (step d); setting a touch table (step e); performing a touch detection (one frame at a time) (step f); outputting touch data (one frame at a time) (step g); and determining if a further detection is needed? If yes, then go to step f; if no, go back to an initial step of this flowchart (step h).

Figure 12C:
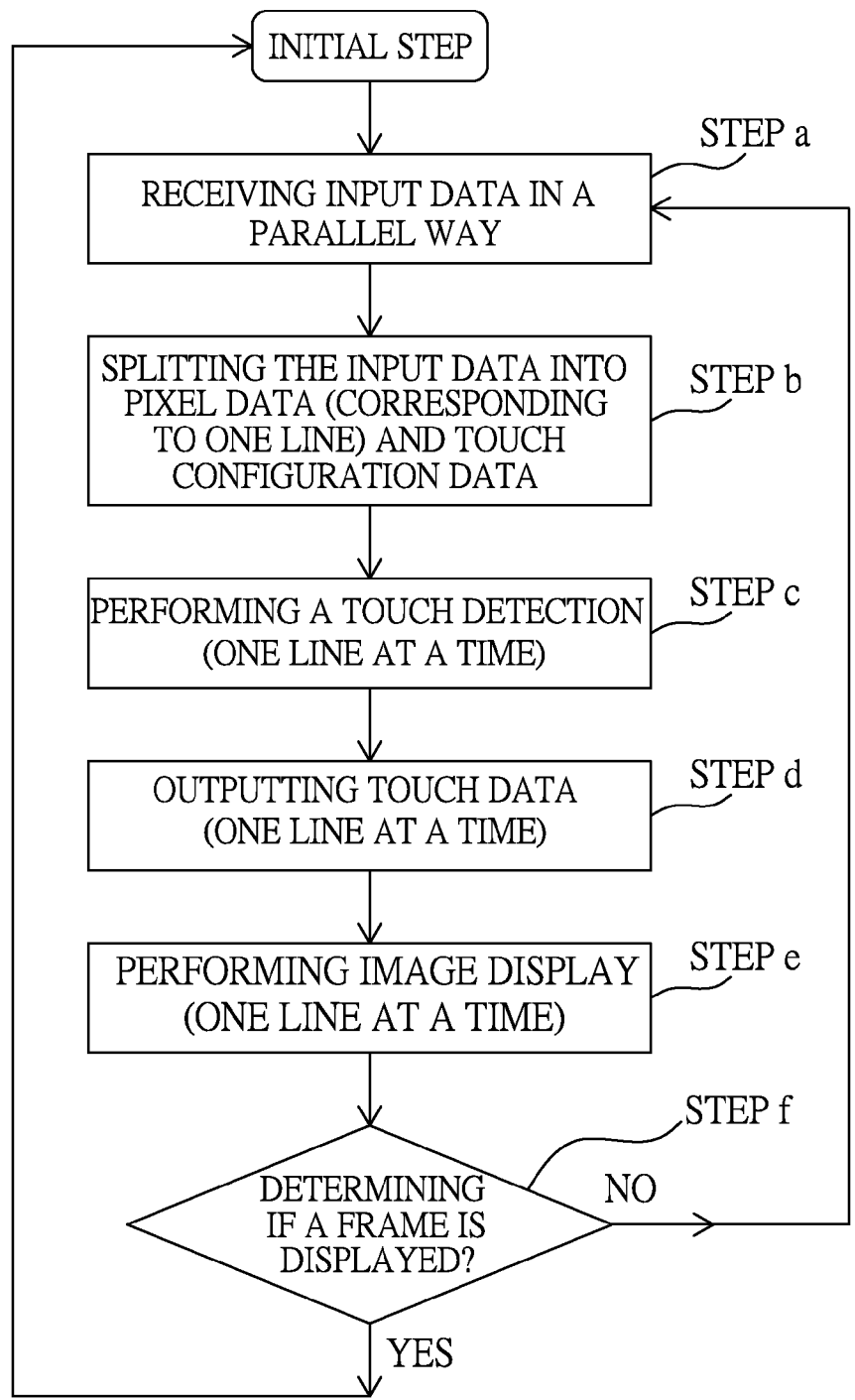

FIG. 12(c) illustrates another scan control flowchart, including: receiving input data in a parallel way (step a); splitting the input data into pixel data (corresponding to one line) and touch configuration data (step b); performing a touch detection (one line at a time) (step c); outputting touch data (one line at a time) (step d); performing image display (one line at a time) (step e); and determining if a frame is displayed? If yes, then go back to an initial step of this flowchart; if no, go to step a (step f).

Figure 12D:
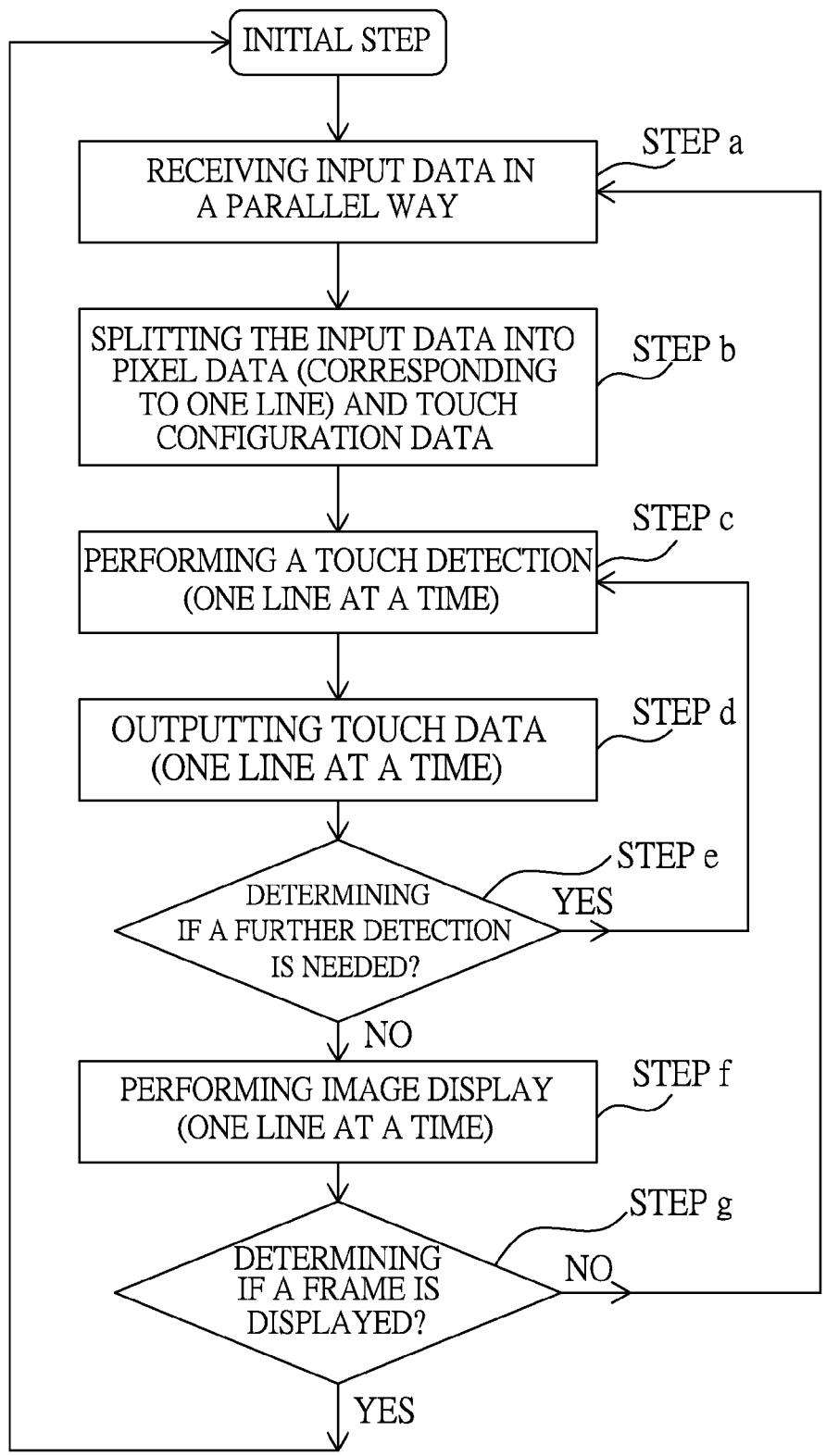

FIG. 12(d) illustrates another scan control flowchart, including: receiving input data in a parallel way (step a); splitting the input data into pixel data (corresponding to one line) and touch configuration data (step b); performing a touch detection (one line at a time) (step c); outputting touch data (one line at a time) (step d); determining if a further detection is needed? If yes, then go to step c; if no, go to step f (step e); performing image display (one line at a time) (step f); and determining if a frame is displayed? If yes, then go back to an initial step of this flowchart; if no, go to step a (step g).

FIG. 13(a)-13(d) illustrates four scan control flowcharts with the control unit 204 receiving the pixel data $D_{IMG}$ and the touch configuration data $D_{TC}$ in a serial way.

Figure 13A:
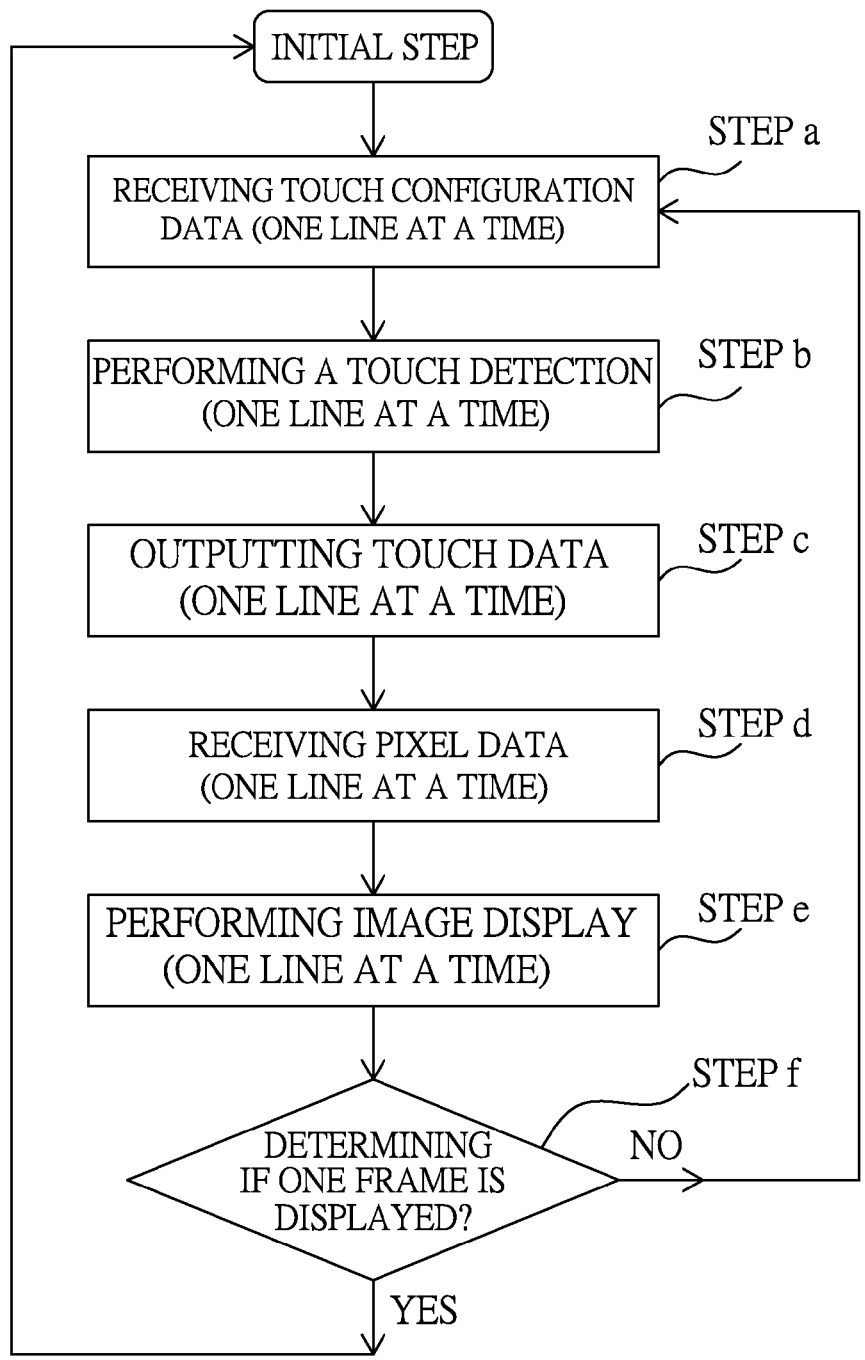
FIG. 13(a)-13(d) illustrates four scan control flowcharts with the control unit of FIG. 2 receiving pixel data and touch configuration data in a serial way.

FIG. 13(a) illustrates a scan control flowchart, including: receiving touch configuration data (one line at a time) (step a); performing a touch detection (one line at a time) (step b); outputting touch data (one line at a time) (step c); receiving pixel data (one line at a time) (step d); performing image display (one line at a time) (step e); and determining if one frame is displayed? If yes, then go to an initial step of this flowchart; if no, go to step a (step f).

Figure 13B:
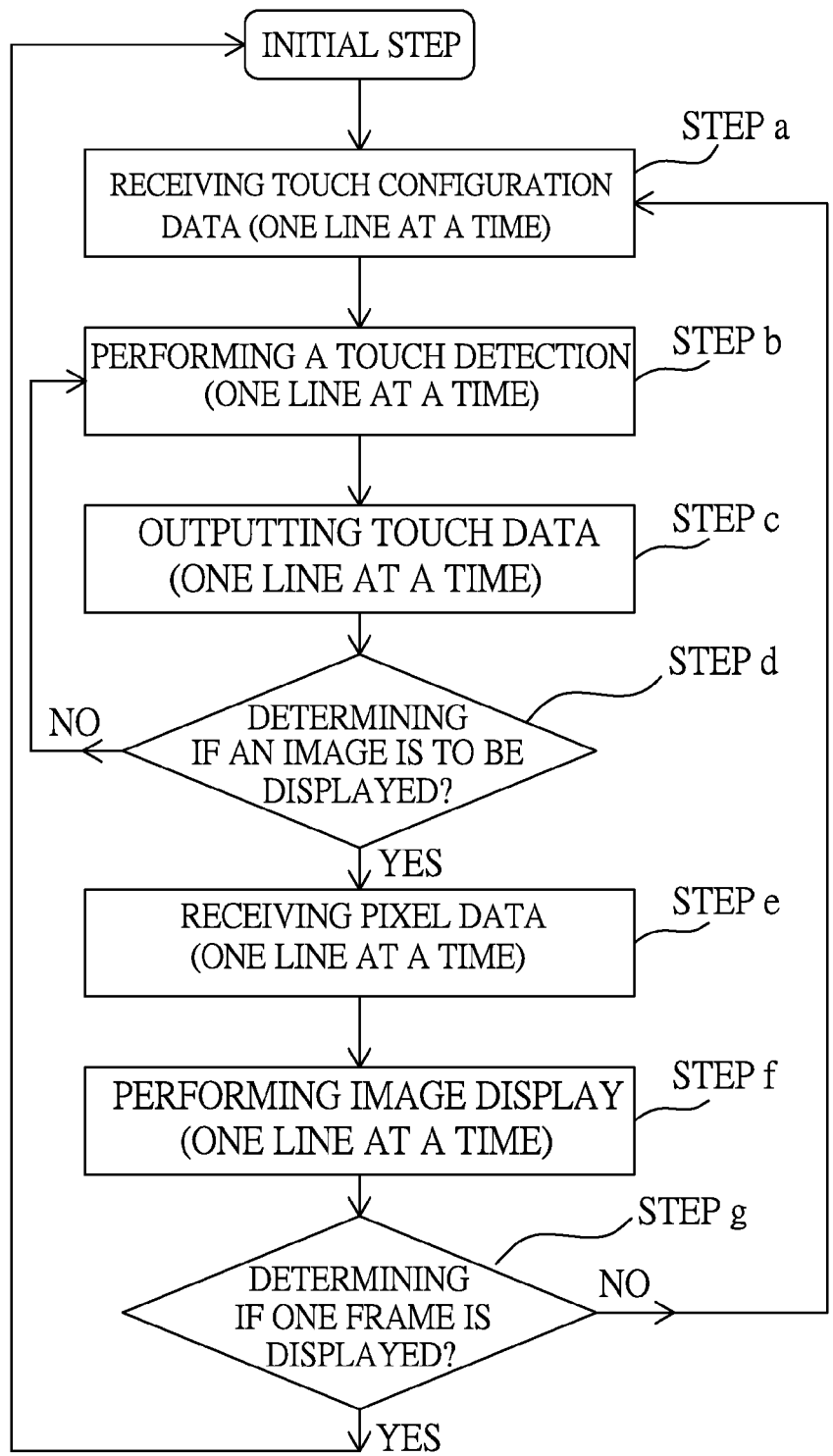

FIG. 13(b) illustrates another scan control flowchart, including: receiving touch configuration data (one line at a time) (step a); performing a touch detection (one line at a time) (step b); outputting touch data (one line at a time) (step c); determining if an image is to be displayed? If yes, then go to step e; if no, go to step b (step d); receiving pixel data (one line at a time) (step e); performing image display (one line at a time) (step f); and determining if one frame is displayed? If yes, then go to an initial step of this flowchart; if no, go to step a (step g).

Figure 13C:
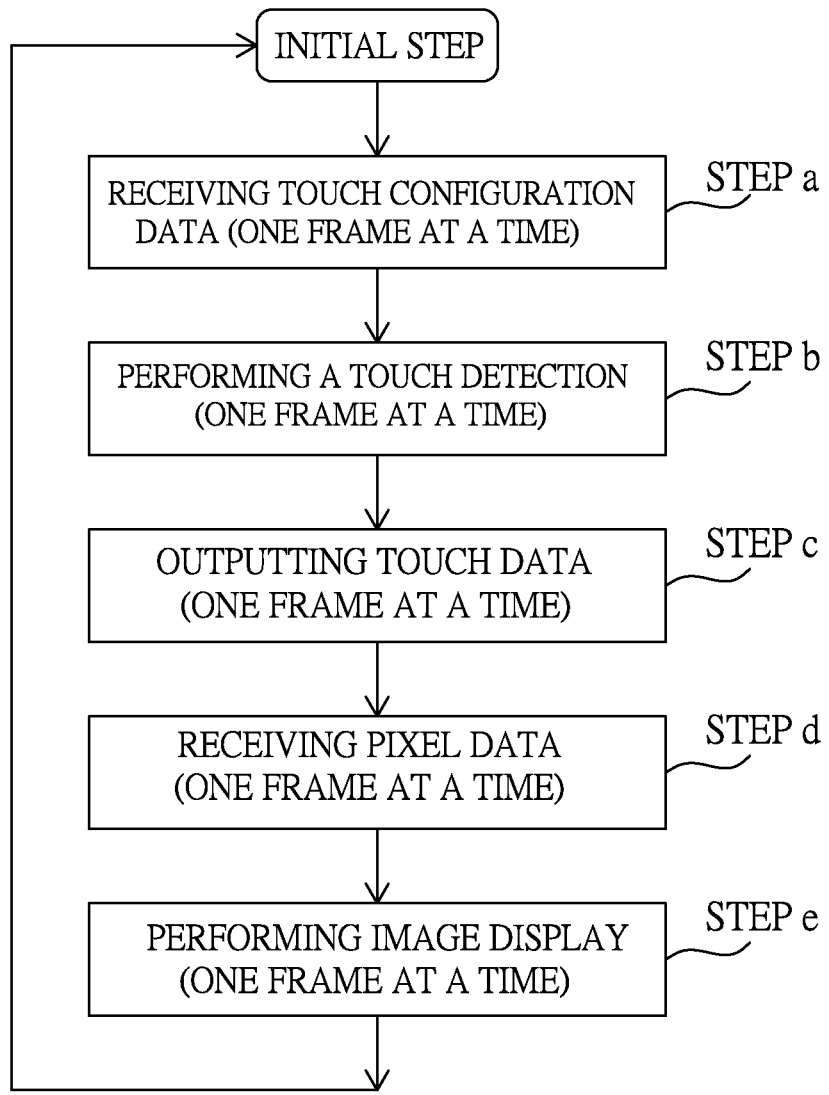

FIG. 13(c) illustrates another scan control flowchart, including: receiving touch configuration data (one frame at a time) (step a); performing a touch detection (one frame at a time) (step b); outputting touch data (one frame at a time) (step c); receiving pixel data (one frame at a time) (step d); and performing image display (one frame at a time) (step e).

Figure 13D:
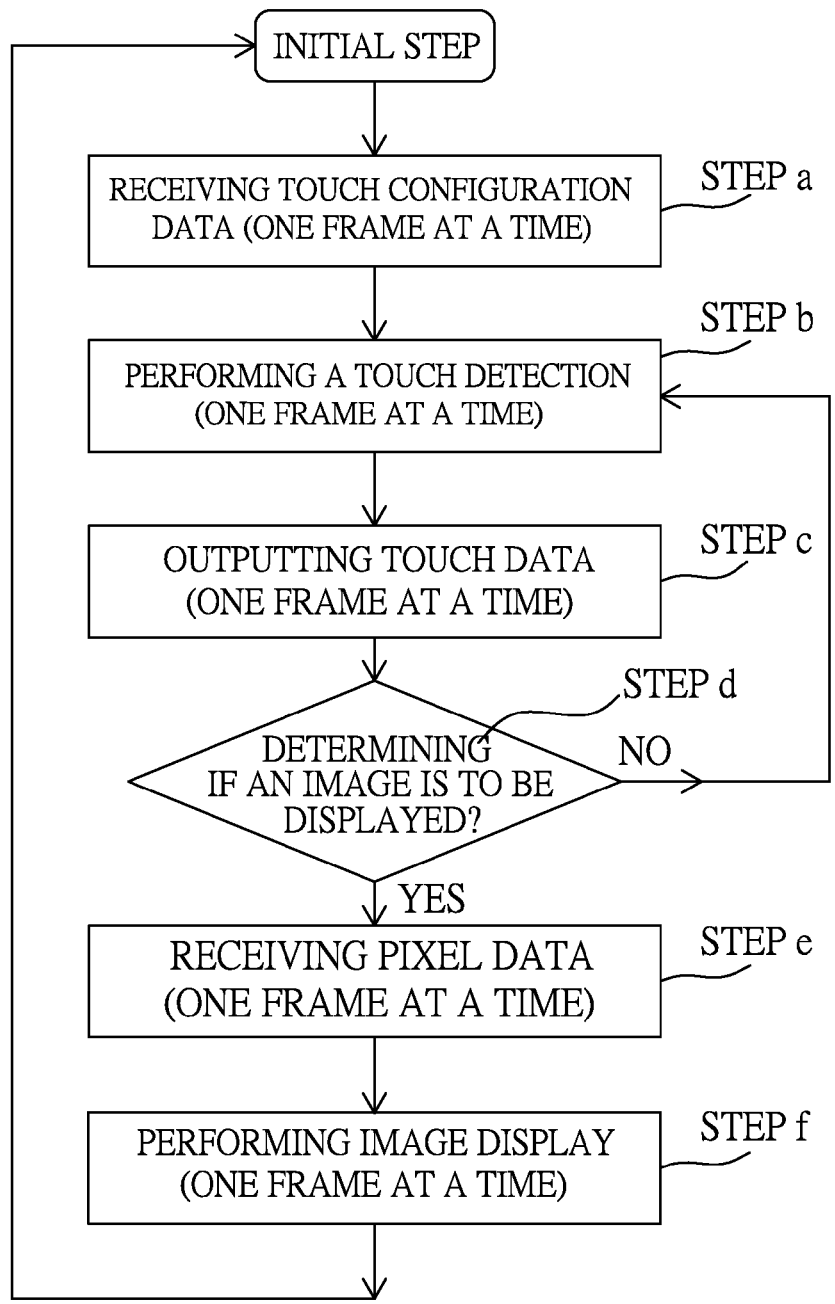

FIG. 13(d) illustrates another scan control flowchart, including: receiving touch configuration data (one frame at a time) (step a); performing a touch detection (one frame at a time) (step b); outputting touch data (one frame at a time) (step c); determining if an image is to be displayed? If yes, then go to step e; if no, go to step b (step d); receiving pixel data (one frame at a time) (step e); and performing image display (one frame at a time) (step f).

In addition to driving a touch display module, the driving circuit of the present invention can also be used to drive a touch module. For example, the touch display driving circuit capable of responding to CPU commands of the present invention can include:

a first interface for receiving touch configuration data from a CPU;

a second interface for coupling with a touch module; and a control unit, which drives the touch module via the second interface to execute a touch detection procedure, wherein the touch detection procedure is determined according to the touch configuration data; and the touch module has a touch array, which is one selected from a group consisting of a capacitive type touch array, a resistive type touch array, an optical type touch array, an acoustic type touch array, a pressure sensing type touch array, and a radar type touch array.

Besides, the touch display driving circuit capable of responding to CPU commands can be implemented by a single integrated circuit or multiple integrated circuits.

The first interface can be used to transmit data in a serial manner or a parallel manner.

The touch configuration data includes multiple control bits.

The multiple control bits can be used to determine a connection configuration of at least one multiplexer, and a weighting configuration of at least one touch point.

The multiple control bits can be further used to enable/disable at least one touch point.

Thanks to the novel designs mentioned above, the present invention possesses the following advantages:

1. The driving circuit of the present invention can configure and execute a touch detection procedure according to a CPU's commands.

2. The driving circuit of the present invention can receive a touch configuration data from a CPU, wherein the touch configuration data has multiple control bits for determining a connection configuration of at least one multiplexer and a weighting configuration of at least one touch point.

3. The driving circuit of the present invention can receive a touch configuration data from a CPU, wherein the touch configuration data has at least one control bit for enabling/disabling at least one touch point.

4. The driving circuit of the present invention can receive a touch configuration data from a CPU, and use the touch configuration data to provide a resistor-capacitor delay compensation function.

5. The driving circuit of the present invention can receive a touch configuration data from a CPU, and use the touch configuration data to provide a dynamic driving function.

6. The driving circuit of the present invention can receive a touch configuration data from a CPU, and use the touch configuration data to provide an adaptive driving function.

7. The driving circuit of the present invention can receive a touch configuration data from a CPU, and use the touch configuration data to provide a multi-stage driving function.

8. The driving circuit of the present invention can receive a touch configuration data from a CPU, and use the touch configuration data to provide a three-dimensional touch detection function.

9. The driving circuit of the present invention can receive a touch configuration data from a CPU, and use the touch configuration data to provide a graphical user interface touch detection function.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch display driving circuit capable of responding to CPU commands, comprising: a first interface for receiving pixel data and touch configuration data from a CPU, wherein said first interface transmits data in a serial manner or a parallel manner and said touch configuration data includes multiple control bits; a second interface for coupling with a touch display module; and a control unit, which drives said touch display module via said second interface to show an image according to said pixel data, and executes a touch detection procedure on said touch display module via said second interface, wherein said touch detection procedure is determined according to said touch configuration data; and said multiple control bits included in said touch configuration data are used to determine a connection configuration of at least one multiplexer, and a weighting configuration of at least one touch point.

2. The touch display driving circuit capable of responding to CPU commands as claim 1, further comprising a third interface for transmitting touch data to said CPU, wherein said touch data is derived by said control unit during an execution of said touch detection procedure.

3. The touch display driving circuit capable of responding to CPU commands as claim 2, wherein said control unit comprises a timing control unit, a source driver unit, a gate driver unit, a touch driver unit, and a touch detection unit.

4. The touch display driving circuit capable of responding to CPU commands as claim 3, wherein said control unit further comprises a memory unit for storing said touch data.

5. The touch display driving circuit capable of responding to CPU commands as claim 2, wherein said touch display driving circuit is implemented by a single integrated circuit.

6. The touch display driving circuit capable of responding to CPU commands as claim 2, wherein said touch display driving circuit is implemented by multiple integrated circuits.

7. The touch display driving circuit capable of responding to CPU commands as claim 2, wherein said touch display module comprises a flat panel display and a touch array.

8. The touch display driving circuit capable of responding to CPU commands as claim 7, wherein said flat panel display is one selected from a group consisting of a thin-film-transistor display, an organic-light-emitting-diode display, a nanometer-carbon-tube display, a super-twisted-nematic display, and a field-emission display.

9. The touch display driving circuit capable of responding to CPU commands as claim 7, wherein said touch array is one selected from a group consisting of a capacitive type touch array, a resistive type touch array, an optical type touch array, an acoustic type touch array, a pressure sensing type touch array, and a radar type touch array.

10. The touch display driving circuit capable of responding to CPU commands as claim 1, wherein said multiple control bits included in said touch configuration data are further used to enable/disable said at least one touch point.

11. The touch display driving circuit capable of responding to CPU commands as claim 1, wherein said control unit uses said touch configuration data to execute said touch detection procedure to provide a resistor-capacitor delay compensation function.

12. The touch display driving circuit capable of responding to CPU commands as claim 1, wherein said control unit uses said touch configuration data to execute said touch detection procedure to provide a dynamic driving function.

13. The touch display driving circuit capable of responding to CPU commands as claim 1, wherein said control unit uses said touch configuration data to execute said touch detection procedure to provide an adaptive driving function.

14. The touch display driving circuit capable of responding to CPU commands as claim 1, wherein said control unit uses said touch configuration data to execute said touch detection procedure to provide a multi-stage driving function.

15. The touch display driving circuit capable of responding to CPU commands as claim 1, wherein said control unit uses said touch configuration data to execute said touch detection procedure to provide a three-dimensional touch detection function.

16. The touch display driving circuit capable of responding to CPU commands as claim 1, wherein said control unit uses said touch configuration data to execute said touch detection procedure to provide a graphical user interface touch detection function.

17. A touch display driving circuit capable of responding to CPU commands, comprising: a first interface for receiving touch configuration data from a CPU; a second interface for coupling with a touch module, wherein said touch module comprises a touch array selected from a group consisting of a capacitive type touch array, a resistive type touch array, an optical type touch array, an acoustic type touch array, a pressure sensing type touch array, and a radar type touch array, said touch display driving circuit is implemented by a single integrated circuit or by multiple integrated circuits; and a control unit, which executes a touch detection procedure on said touch module via said second interface, wherein said touch detection procedure is determined according to said touch configuration data; said touch configuration data includes multiple control bits; and wherein said multiple control bits included in said touch configuration data are used to determine a connection configuration of at least one multiplexer, and a weighting configuration of at least one touch point.

18. The touch display driving circuit capable of responding to CPU commands as claim 17, further comprising a third interface for transmitting touch data to said CPU, wherein said touch data is derived by said control unit during an execution of said touch detection procedure.

19. The touch display driving circuit capable of responding to CPU commands as claim 17, wherein said first interface transmits data in a serial manner or a parallel manner.

20. The touch display driving circuit capable of responding to CPU commands as claim 17, wherein said multiple control bits included in said touch configuration data are further used to enable/disable said at least one touch point.

* * * * *